United States Patent [19]

Pacia

[11] Patent Number: 4,957,226

[45] Date of Patent: Sep. 18, 1990

[54] AUTOMATIC FOOD DISPENSING METHOD, APPARATUS AND UTENSIL

[75] Inventor: Dante V. Pacia, Reno, Nev.

[73] Assignee: Wells Manufacturing, Verdi, N.Y.

[21] Appl. No.: 58,470

[22] Filed: Jun. 5, 1987

[51] Int. Cl.⁵ ............................................. B05D 1/00
[52] U.S. Cl. .................................. 222/643; 222/108; 222/191; 222/205; 401/139; 401/266
[58] Field of Search ................. 401/261, 266, 139; 30/141; 222/191, 108, 205, 642, 643

[56] References Cited

U.S. PATENT DOCUMENTS

| | | | |
|---|---|---|---|
| 705,018 | 7/1902 | Bechtold | 222/424.5 |
| 1,038,180 | 9/1912 | Moreland | 401/266 X |
| 1,606,038 | 11/1926 | Norman | 30/141 |
| 1,666,106 | 4/1928 | Norman | 30/141 |
| 2,252,119 | 8/1941 | Edmonds | 222/205 UX |
| 2,550,210 | 4/1951 | Vance, Jr. | 222/205 X |
| 2,953,170 | 9/1960 | Bush | 222/205 X |
| 3,090,071 | 5/1963 | Le Brooy | 401/266 |
| 3,113,703 | 12/1963 | Rundle | 222/191 |
| 3,133,679 | 5/1964 | Brown | 222/205 |
| 3,155,544 | 11/1964 | McConnell et al. | 401/266 X |
| 3,612,358 | 10/1971 | Massa | 222/191 |
| 4,475,666 | 10/1984 | Bilbrey et al. | 222/14 |
| 4,477,003 | 10/1984 | Baker et al. | 222/642 |
| 4,565,304 | 1/1986 | Dronet | 222/108 |
| 4,747,766 | 5/1988 | Van Meulenbeke | 222/643 X |

FOREIGN PATENT DOCUMENTS 1302049  7/1962  France ........................ 222/205

Primary Examiner—Joseph J. Rolla
Assistant Examiner—Born Milef
Attorney, Agent, or Firm—Herbert C. Schulze

[57] ABSTRACT

An automatic food dispensing method, apparatus and utensil primarily for use in fast food restaurants, bakeries, and the like. The method and apparatus comprise a pumping system from a supply through a pump in a controlled amount with a reverse action of the pump after the appropriate amount has been dispensed in order to avoid it dripping. Other drip proof arrangements, such as valving are also utilized optionally. The utensil comprises a handle attached to a container and spreading utensil such as a spoon, ladle, or the like, wherein predetermined portions of a food or substance used in a food may be dispensed either continually or as predetermined quantities. The device consists of a spoon or other appropriately shaped utensil attached to a hollow handle which terminates in a non interfering connection with the interior of the utensil at one end and terminates at the other end in a connection to a food supply source.

4 Claims, 4 Drawing Sheets

U.S. Patent  Sep. 18, 1990  Sheet 1 of 4  4,957,226
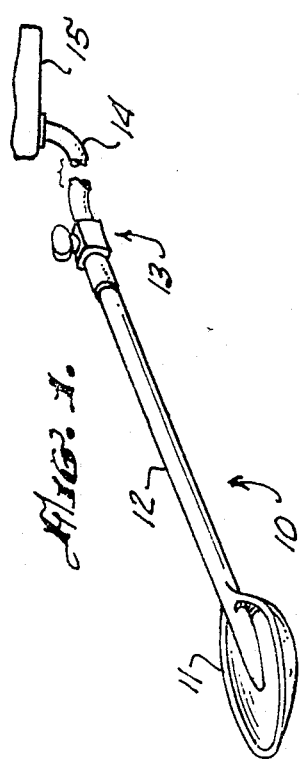
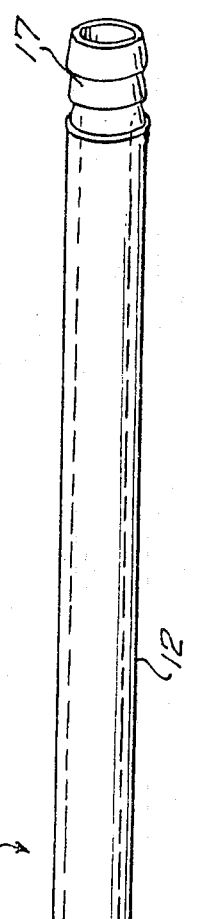
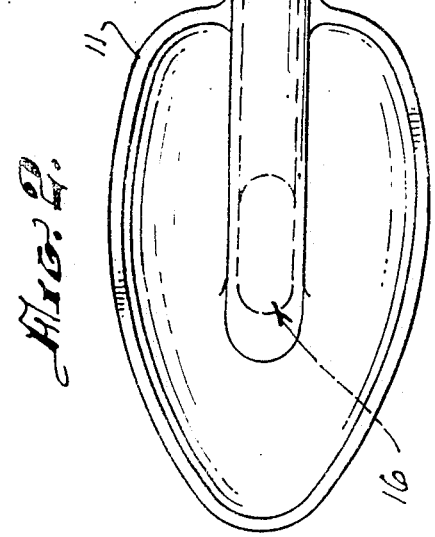
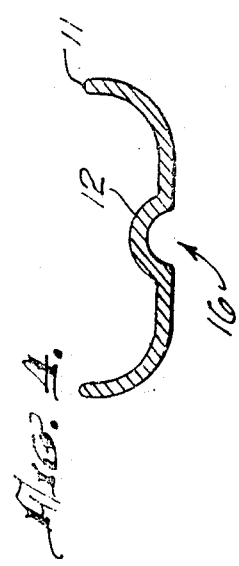
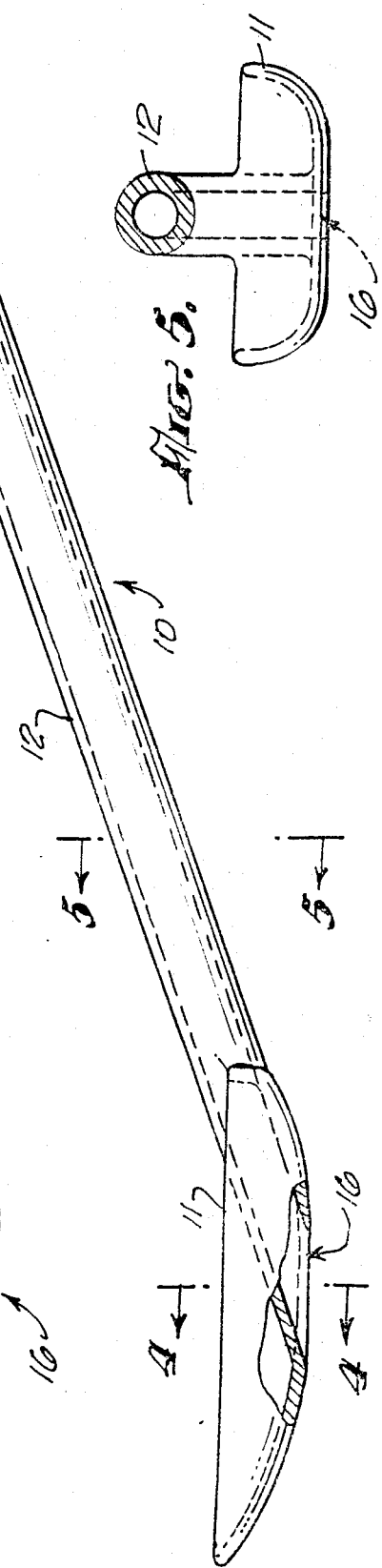

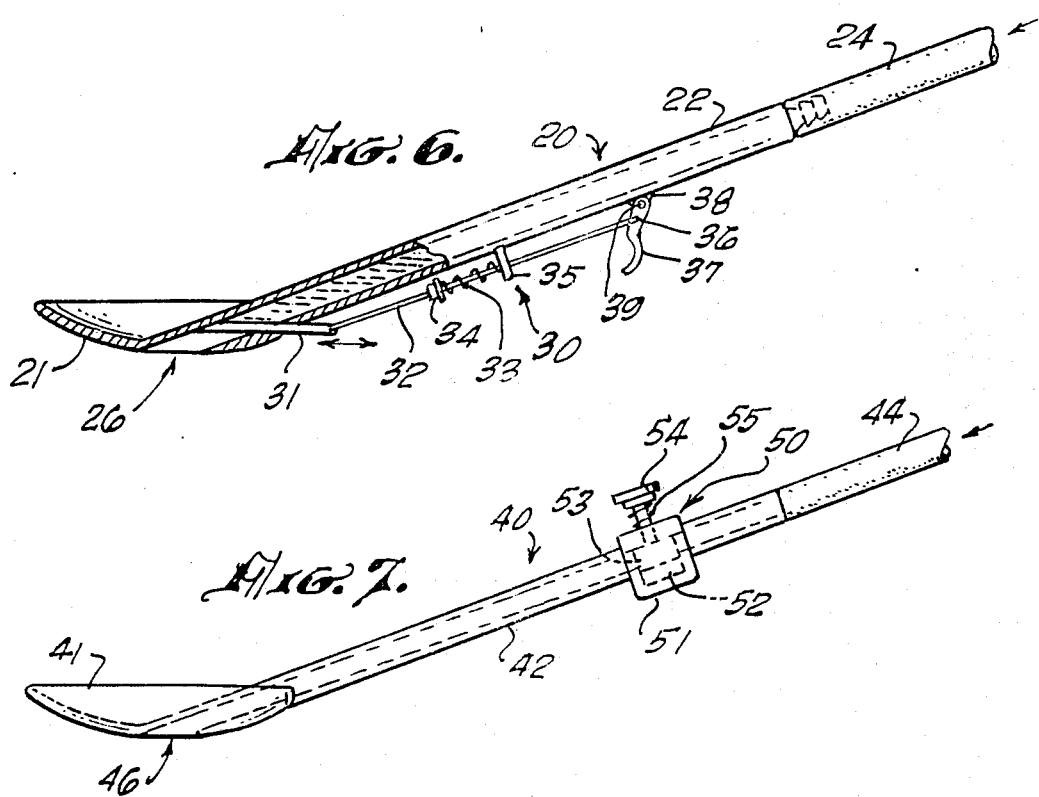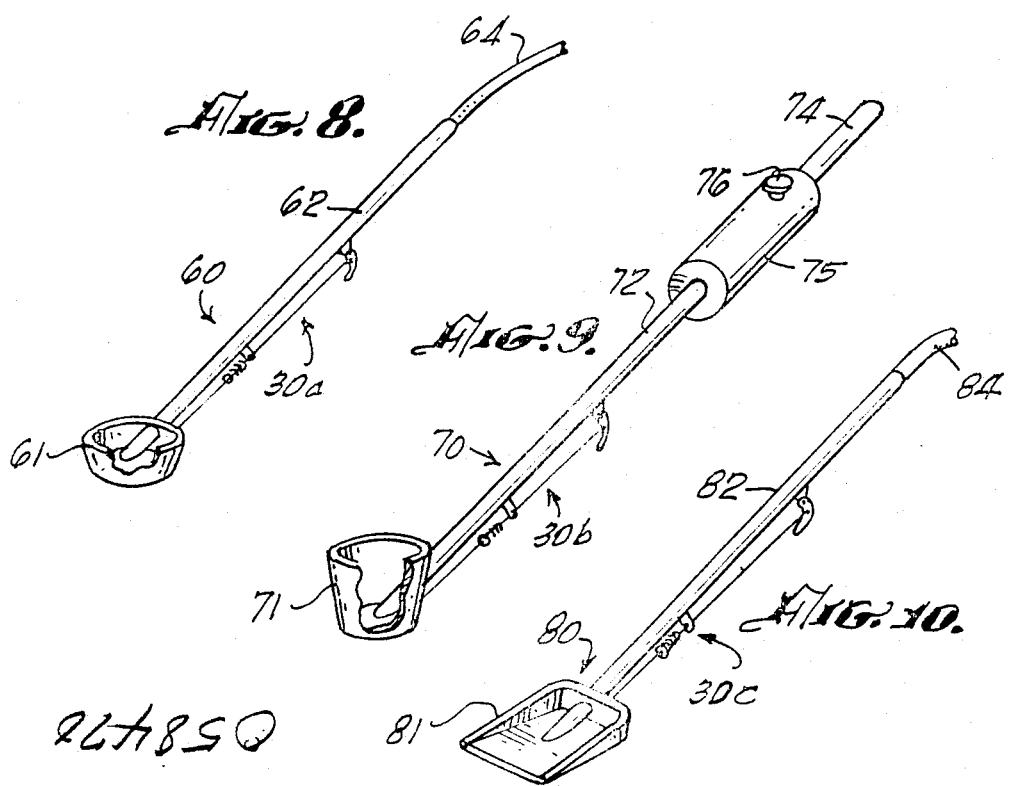

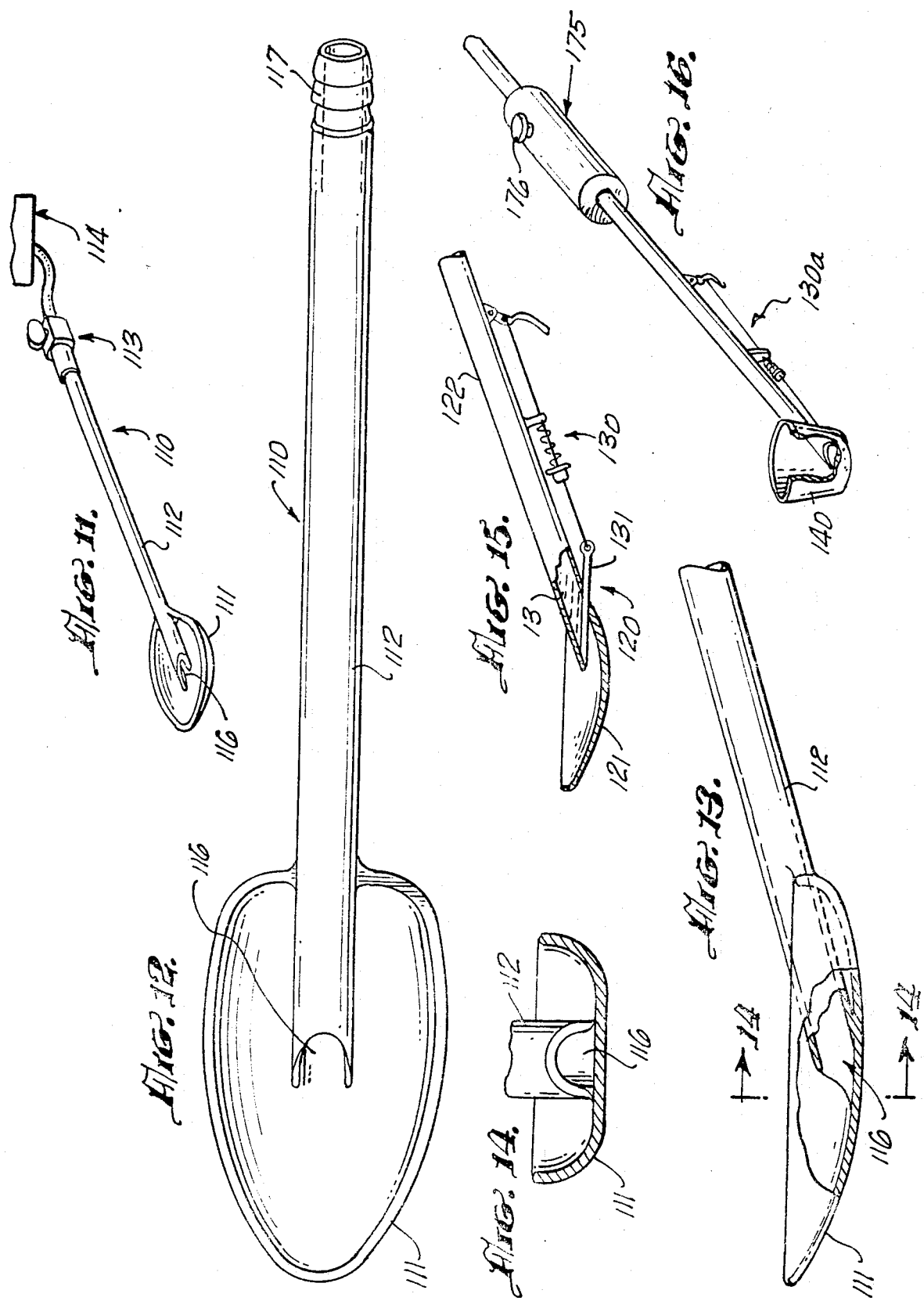

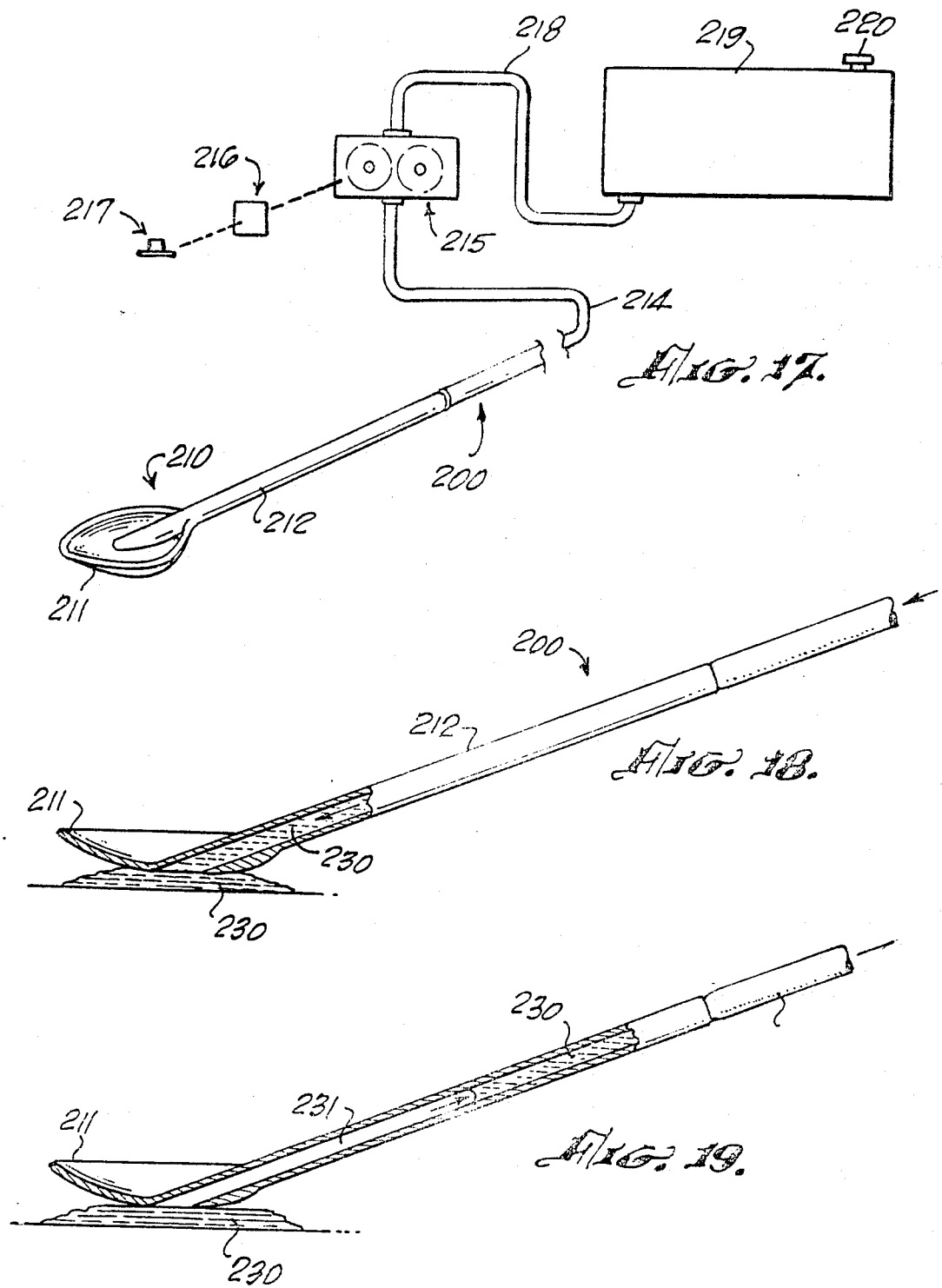

AUTOMATIC FOOD DISPENSING METHOD, APPARATUS AND UTENSIL

CROSS REFERENCE TO RELATED PATENT APPLICATIONS

There are no patent applications related to this application filed by me.

BACKGROUND OF THE INVENTION

I Field of the Invention

This invention is in the general field of food dispensing and measuring methods and apparatus; the invention is even more particularly directed towards a method and an apparatus for automatic dispensing of food or the like for use in fast food restaurants or other such institutions or purposes; the invention is even more particularly directed to the ultimate distribution apparatus comprising a utensil shaped device into which predetermined or continuous quantities of food, or the like, are dispensed for use by an operator, and wherein dripping is eliminated.

II Description of the Prior Art

There is no prior art known to me concerning the dispensing of food, automatically, through the use of a utensil shaped device, and the method of pumping with a reverse action to avoid dripping.

The use of automatic dispensing devices for food condiments (mustard, catsup and the like) is known and is employed. In such instances there is merely a pump, usually with a trigger or the like, and sometimes with a flat spreading plate or the like through which the mustard, catsup and the like may be dispensed onto a hamburger or similar type of food and spread around by a flat plate or the like through which the material is dispensed.

The present invention is entirely different in that it collects within a ladle or the like an accurately predetermined and desired amount of the food item concerned, and then dispense it for use, or can provide for continuous flow with the predetermined amounts which fill the ladle or the like being dispensed by tilting or otherwise manipulating the utensil, and most importantly by a complete unique system of pumping of the food material being dispensed, and reversing after the appropriate amount of material has been dispensed, all dripping, which is normally a cause for concern and lack of cleanliness, is eliminated.

SUMMARY OF THE INVENTION

In the fast food business, which is an increasingly important source of food throughout the world, and in many preprepared foods which are purchased frozen or in other package condition for use in the home, there is an increased and continuing requirement for accurate dispensing of foods.

For example, in the making of pizzas, it is customary, and necessary, to dispense different quantities of different types of food materials onto the pizza in order to make the desired combination. As an example, it may be that a particular pizza may require a certain quantity of tomato sauce; a certain quantity of mushroom mixture; a certain quantity of meat sauce, and the like. In the past, this has been a matter of guess work or tedious measurements and application, to a large extent, with the result that uniformity is not always achieved.

With the automatic food dispensing equipment presently available various mixtures can be dispensed through a tube or the like under pressure, but once again this must be controlled at a central or basic location by triggers, valves, or the like. Such devices have the common defect that dripping almost always results after the cut off of a theoretically desired amount of material.

It has long been desired to be able to dispense rapidly and repeatedly, like quantities, and, also, to be able to spread them in an appropriate manner upon the food, or in connection with the food being utilized.

I have studied this situation for a considerable period of time and have experimented with various designs of food dispensing apparatus and the like. Several factors must be considered including cleanliness, accuracy, ease of operation, and the like.

I have now conceived and designed an ultimate dispensing utensil arrangement wherein more or less customary utensils, which are easily understood by chefs and others skilled in food preparation, are connectable to an appropriate handle (once again of a nature such that is understood and easily used by those skilled in these arts), and in turn can be connected to the source of supply so that accurate and understandable quantities can be used and manipulated in preparation of the food product. I have additionally provided a method for pumping the food stuffs desired to be dispensed with a unique pumping arrangement which automatically provides the correct and desired amount and upon completion of such dispensing automatically reverses so as to withdraw the material from the hollow tube or handle so that there is no dripping.

I have accomplished the foregoing desired objects by providing a series of customarily used food processing implement heads connected, or connectable, to a hollow handle in such manner that interior of the utensil is not interfered with, and in such manner that the utensil is easily used and understood by the operator.

If desired, the apparatus may be equipped with appropriate valving or the like so as to intermittently fill the utensil desired, or, it may be used continuously with a filled utensil being expelled quickly by turning it over, or the like. It is also possible with this new invention to interchange the utensil head on a single handle if desired. This is accomplished by utilizing a handle having a specially shaped terminal end to terminate in the utensil head.

The most desirable and unique method of the intermittent use as set forth, however, is embodied in my unique pumping with a reverse feature as will be described in more detail in the description of a preferred embodiment.

It is an object of this invention to provide an automatic food dispensing utensil;

Another object of this invention is to provide an automatic food dispensing utensil connectable to a pressurized source of the food to be dispensed;

Another object of this invention is to provide such an utensil as has been herein described wherein the utensil may be used for intermittent disposition of like quantities of food items or components.

Another object of this invention is to provide a method for the accurate dispensing of food through the utensil as described wherein a pumping arrangement is utilized which pumps the exact correct amount of material and then goes into a reverse posture such that there will be no dripping of the material beyond the amount desired to be dispensed.

The foregoing and other objects and advantages of this invention will become apparent to those skilled in the art upon reading the description of a preferred embodiment which follows in conjunction with a review of the appended drawings.

BRIEF DESCRIPTIONS OF THE DRAWINGS

FIG. 1 is a perspective schematic view of a preferred embodiment of a utensil for use in the method of this invention indicating its use with a food supply source;

FIG. 2 is an enlarged plan view of the device as illustrated in FIG. 1;

FIG. 3 is a side elevation on FIG. 2, partially broken away and partially sectioned;

FIG. 4 is a section on 4—4 of FIG. 3;

FIG. 5 is a section on 5—5 of FIG. 3;

FIG. 6 is a schematic partially sectioned view of a first alternate embodiment;

FIG. 7 is a schematic view of a second alternate embodiment;

FIG. 8 is a schematic perspective of a third alternate embodiment;

FIG. 9 is a schematic perspective partially broken away of a fourth alternate embodiment;

FIG. 10 is a schematic perspective of a fifth alternate embodiment.

FIG. 11 is a perspective of another of a sixth alternate embodiment of a utensil for use in the method of this invention;

FIG. 12 is an enlarged plan view of the utensil of FIG. 11;

FIG. 13 is a partially broken away, partially sectioned side view of the ladle portion of FIG. 12;

FIG. 14 is a section on 14—14 of FIG. 13;

FIG. 15 is a seventh alternate embodiment;

FIG. 16 is an eighth alternate embodiment;

FIG. 17 illustrates the overall method of this invention and the apparatus by which this invention can be utilized wherein an embodiment of the nature of the utensil of FIG. 2 is being used;

FIG. 18 is a partially broken away partially sectioned side elevation showing how the food is dispensed; and FIG. 19 illustrates the elimination of dripping by reversal of the flow of the food material within the tubular handle.

DESCRIPTION OF A PREFERRED EMBODIMENT

Examining FIGS. 1, 2, 3, 4, and 5 together, it will be observed that there is a ladle shaped implement generally 10, having a ladle or spoon portion 11 connected to a tubular handle 12, which has an opening going through the bottom of the ladle at 16 through which material flowing through the tube 12 will be dispensed. At 17 there is shown a connector unit for a tubular connection such as the connection to a valve 13 as indicated in FIG. 1 and through the valve to a supply of material 15 through auxiliary tubing 14.

FIG. 6 illustrates a ladle of essentially exactly the same construction as that indicated in the first figures wherein the tubular handle 22 is connected to the ladle portion 21 with opening 26 through the bottom of the ladle. In this case however a sliding valve member 31 has been provided, which is controlled by rod 32 mounted at 35 the handle 22 and held in a normally closed position by spring 33 between the mounting members 35 and a collar 34 upon control rod 22. A trigger arrangement 37 is connected to the rod 32 at 36 by means of an appropriate bolt, rivet or the like, and is rotatable therein. The trigger 39 is connected to the tubular portion 22 at 38 by a pivotal connection. The tube 24 will be connected to the basic supply of food.

FIG. 7 illustrates a simple push button valve arrangement connected to a ladle of the same general construction as shown in FIGS. 1 through 5 wherein the tubular member 42 is connected to the ladle 41 with opening 46 at the bottom of the ladle. The tube 42 is connected to another tube 44 which receives the supply of material to be dispensed. A valve of customary construction 50 is attached to the tubular handle 42 and consists of a casing 51 with a push button 54 and spring loaded shaft 55 which controls movement of a plug 52 which opens or closes passageway through 42.

FIG. 8 shows generally another embodiment 60 comprising a handle 62 connected to supply 64 and having a differently configured ladle portion 61 with an operating valve 30a similar to the operating valve 30 of FIG. 6.

FIG. 9 illustrates a device 70 generally very much like that shown in FIG. 8 wherein the trigger arrangement 30b (similar to 30 of FIG. 6) controls the release of material through the bottom of ladle portion 71. The hollow tubular handle 72 in this case terminates in a reservoir 75 with a control valve 76 by which a fixed amount of material can be held in the reservoir which is refilled by tubular connection 74.

The device of FIG. 10 merely has a different type end apparatus 81 otherwise having control 30c similar to control 30 described in FIG. 6 and having a tubular handle 82 connected to material supply 84.

FIGS. 11, 12, 13 and 14 show another alternate embodiment but in this case an alternate embodiment in which the material being dispensed flows into rather than exterior of the ladle.

The ladle device 110 is shown to have a tubular handle 112 a ladle portion 111 and an opening 116 which dispenses the material into the ladle rather than exterior of it. A valve arrangement at 113 can control the flow of material from supply 114. The ladle itself will be connected to the tubular portion 113 by a suitable connector means as shown at 117.

This type device may also be modified so that the material flows through a device generally 130 as shown in FIG. 15 wherein the tubular handle 122 has the valving arrangement 131 at the end, to allow material to fill the ladle portion 121. In this case the trigger device generally 130 will act in the same manner as trigger device 30 as illustrated in FIG. 6.

FIG. 16 illustrates another embodiment wherein the same principle as being used here is utilized and that is that the ladle or cup portion 140 will be filled by a combination of the action of the triggering device 130a and the controlled supply reservoir 175 activated by valve 176 of any customary design.

FIGS. 17, 18, and 19 illustrate a ladle of the nature illustrated in FIGS. 1 through 5 but being operated by the particularly unique dispensing method of this invention. In this case the apparatus generally 200 comprises a ladle portion 211 having an opening on its underside, it being understood that it could have the opening within it also. This device is connected to hollow tubular handle 212 and connected at 200 through tubing or the like to a dispensing tube 214 which connects to a pump. Many types of pumps may be used, but we have found that a peristaltic pump is extremely efficient. This pump pumps from tubing 218 and material supply 219.

The material supply storage can be refilled at 220 as desired.

The pump 215 is connected to a controller 217 by means which count the revolutions of the pump or other measurement of material through the pump and when a predetermined amount has been received the controller 217 reverses the pump through a reversing switch 216 so as to draw back part of the material still in the tube. During pumping operation the tube will be filled and the material 230 will be being expelled as shown in FIG. 18. When the pump reverses, the material 230 will be drawn back in such manner that there is an empty portion of the tubing at 231 so that there cannot be any dripping.

When next desired, the operator again activates the pump and the sequence will be repeated.

While the method and apparatus embodiments herein shown and described are fully capable of achieving the objects and advantages of this invention it will be clear to those skilled in the art that this particular illustration and description is for purposes of description only and not for purposes of limitation.

I claim:

1. The method of dispensing food ingredients comprising: (1) placing the food ingredients to be dispensed in a supply container; (2) connecting a means to withdraw said food ingredients from the supply container to a pump at an inlet means; (3) connecting an outlet means of said pump to a food manipulating utensil by means of a hollow handle through which passes said food ingredients to said food manipulating utensil, said food manipulating utensil having a cavity for receiving said food ingredients; (4) activating said pump for a predetermined time thus causing a predetermined amount of said food ingredients to pass through said hollow handle and onto the cavity of the utensil so as to form a pool of food ingredient on the cavity, and then from the utensil onto a food product; (5) deactivating said pump when the desired amount of food ingredient has been transferred through said utensil; and (6) manipulating said utensil so as to place the dispensed food ingredient in the position desired with relation to the food product.

2. The method of claim 1 wherein said pump is reversable and upon completion of the dispensing of the desired amount of food ingredient, the pump is caused to reverse sufficiently so as to withdraw the food ingredient from its dispensing aperture a sufficient distance so that it does not drip therefrom.

3. The method of claim 2 wherein a peristalic pump is used as the pump means.

4. The method of claim 2 wherein an electronic controller controls the amount of food ingredient being dispensed and the amount of reverse withdrawing thereof from the dispensing aperture.

* * * * *